Patented Jan. 18, 1949

2,459,544

UNITED STATES PATENT OFFICE 2,459,544

ALKYL NORCAMPHANYL ETHERS

Louis Schmerling, Riverside, Ill., assignor to Universal Oil Products Company, Chicago, Ill., a corporation of Delaware No Drawing. Application April 30, 1945, Serial No. 591,219

8 Claims. (Cl. 260—611)

This application is a continuation-in-part of my copending application Serial No. 529,410, filed April 3, 1944, which in turn is a continuation-in-part of my application, Serial No. 475,962, filed February 15, 1943, now U. S. Patent No. 2,436,058.

This invention relates to alkyl norcamphanyl ethers and to a method of preparing them.

An object of this invention is to provide an alkyl norcamphanyl ether which is produced easily from readily available raw materials.

In one embodiment of this invention alkyl norcamphanyl ethers are produced by reacting an alkanol and a halo-bicyclo-(2,2,1)-heptane.

For use in my process, a 2-halo-bicyclo-(2,2,1)-heptane, and particularly such a compound in which the halogen is a middle halogen, namely chlorine or bromine, is obtainable from any source including the addition of a hydrogen halide to a bicyclo-(2,2,1)-heptene, a halogen-hydrogen exchange reaction between an alkyl halide and a bicyclo-(2,2,1)-heptane in the presence of a Friedel-Crafts catalyst, and the condensation of an alkyl halide and a bicyclo-(2,2,1)-heptene in the presence of a Friedel-Crafts catalyst. Such 2-halo-bicyclo-(2,2,1)-heptanes have the general formula:

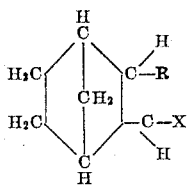

in which R represents an alkyl group or a hydrogen atom and X represents an atom of a halogen, particularly a middle halogen, namely chlorine or bromine.

An alkyl norcamphanyl ether is produced by reacting a 2-halo-bicyclo-(2,2,1)-heptane and an alkanol at a temperature of from about 100° to about 300° C.

Different types of alkanols do not necessarily react with a 2-halo-bicyclo-(2,2,1)-heptane with equal ease. In general, primary alkanols give the highest yields of ethers, secondary alkanols produce intermediate yields, while tertiary alkanols give the lowest yields of ethers, probably because of the relative ease with which these different alkanols undergo dehydration. When employing a tertiary alkanol in this reaction, it may sometimes be preferable to modify the procedure by dissolving sodium metal in the alkanol before heating it with a halo-bicycloheptane.

The reactions which occur when 2-chloro-bicyclo-(2,2,1)-heptane is heated with methyl alcohol may be illustrated by the following equations:

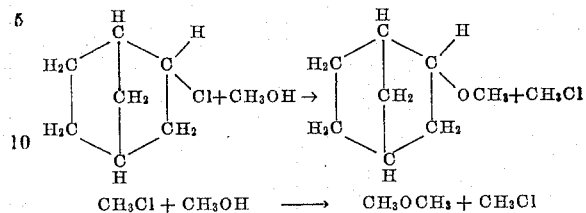

The following data are given to illustrate the character of results obtained by the use of the present process, although the results presented are not introduced with the intention of unduly restricting the broad scope of the invention.

16.5 parts by weight of 2-chloro-bicyclo-(2,2,1)-heptane and 40 parts by weight of methyl alcohol, upon being heated in an autoclave at 200° C. for 4 hours yielded 15 parts by weight of methyl norcamphanyl ether, also known as 2-methoxy-bicyclo-(2,2,1)-heptane which boiled at 152° C. at atmospheric pressure and had a refractive index, $n_D^{20}$, of 1.4570. There was also obtained as by-product of the reaction 18.5 parts by weight of material boiling at —25° C. to —23° C.; this consisted of a mixture of methyl chloride and methyl ether. Similar results were obtained in another run in the presence of 3 parts by weight of magnesium oxide.

The type of results obtained by my process are evident from the preceding specification and example, although they are not to be construed to limit unduly the broad scope of the invention.

I claim as my invention:

1. A process for producing an alkyl norcamphanyl ether which comprises reacting as the sole reactants in the process a primary alkanol and a 2-halo-bicyclo-(2,2,1)-heptane at a temperature of from about 100° to about 300° C.

2. A process for producing an alkyl norcamphanyl ether which comprises reacting as the sole reactants in the process a secondary alkanol and a 2-halo-bicyclo-(2,2,1)-heptane at a temperature of from about 100° to about 300° C.

3. A process for producing an alkyl norcamphanyl ether which comprises reacting as the sole reactants in the process a tertiary alkanol and a 2-halo-bicyclo-(2,2,1)-heptane at a temperature of from about 100° to about 300° C.

4. A process for producing an alkyl norcamphanyl ether which comprises reacting as the sole reactants in the process an alkanol and a 2-halo-bicyclo-(2,2,1)-heptane at a temperature of from about 100° to about 300° C.

5. A process for producing an alkyl norcamphanyl ether which comprises reacting as the sole reactants in the process an alkanol and a 2-chloro-bicyclo-(2,2,1)-heptane at a temperature of from about 100° to about 300° C.

6. A process for producing an alkyl norcamphanyl ether which comprises reacting as the sole reactants in the process an alkanol and a 2-bromo-bicyclo-(2,2,1)-heptane at a temperature of from about 100° to about 300° C.

7. A process for producing methyl norcamphanyl ether which comprises reacting as the sole reactants in the process methanol and 2-chloro-bicyclo-(2,2,1)-heptane at a temperature of from about 100° to about 300° C.

8. A process for producing methyl norcamphanyl ether which comprises reacting as the sole reactants in the process methanol and 2-bromo-bicyclo-(2,2,1)-heptane at a temperature of from about 100° to about 300° C.

LOUIS SCHMERLING.

REFERENCES CITED

The following references are of record in the file of this patent:

UNITED STATES PATENTS

| Number | Name | Date |
| --- | --- | --- |
| 2,345,573 | Bruson | Apr. 4, 1944 |
| 2,360,898 | Sarbach | Oct. 24, 1944 |

OTHER REFERENCES

Beilstein, "Handbuch der Organischen Chemie," 4th edition, vol. 6, page 89.

Meerwein et al., Annalen der Chemie, Liebig's, vol. 435 (1924), pages 181, 184.